(12) United States Patent
Fujioka

(10) Patent No.: US 12,489,989 B2
(45) Date of Patent: Dec. 2, 2025

(54) IMAGE CORRECTION APPARATUS THAT PERFORMS COLOR MATCHING BETWEEN MULTIPLE IMAGE PICKUP APPARATUSES THAT TAKE IMAGE OF DISPLAY APPARATUS, IMAGE PICKUP SYSTEM, CONTROL METHOD, AND STORAGE MEDIUM

(71) Applicant: CANON KABUSHIKI KAISHA, Tokyo (JP)

(72) Inventor: Masaki Fujioka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 374 days.

(21) Appl. No.: 18/181,861

(22) Filed: Mar. 10, 2023

(65) Prior Publication Data
US 2023/0300476 A1 Sep. 21, 2023

(30) Foreign Application Priority Data
Mar. 17, 2022 (JP) ................. 2022-042125

(51) Int. Cl.
*H04N 23/84* (2023.01)
*G06T 5/80* (2024.01)
(Continued)

(52) U.S. Cl.
CPC ............... *H04N 23/84* (2023.01); *G06T 5/80* (2024.01); *G06T 7/80* (2017.01); *G06T 7/90* (2017.01);
(Continued)

(58) Field of Classification Search
CPC ...... H04N 23/84; H04N 23/90; H04N 1/6055; G06T 5/80; G06T 7/80; G06T 7/90; G06T 2207/10024; G06T 2207/30244
(Continued)

(56) References Cited

U.S. PATENT DOCUMENTS

2009/0195565 A1* 8/2009 Kimura ................ G09G 3/3406
345/690
2015/0110398 A1* 4/2015 Totsuka ................ G06T 11/001
382/167
(Continued)

FOREIGN PATENT DOCUMENTS

JP 2002-135790 A 5/2002
JP 2012-068364 A 4/2012

*Primary Examiner* — Ali Bayat
(74) *Attorney, Agent, or Firm* — Cowan, Liebowitz & Latman, P.C.

(57) ABSTRACT

An image correction apparatus which improves the accuracy of color matching between image pickup apparatuses. The image correction apparatus performs color matching between the image pickup apparatuses using picked-up images generated by displaying a display image on a display screen and causing the plurality of image pickup apparatuses to shoot the display image. In the image correction apparatus, viewing angle correction values for use in correcting viewing angle characteristics resulting from positions of the plurality of image pickup apparatuses with respect to the display screen to a predetermined viewing angle characteristics are stored in memory, corrected images are generated by subjecting the display image in the picked-up images to correction using the viewing angle correction values, and color correction values for use in color matching between the plurality of corrected images are calculated.

13 Claims, 11 Drawing Sheets

(51) Int. Cl.
　　　*G06T 7/80*　　　　(2017.01)
　　　*G06T 7/90*　　　　(2017.01)
　　　*H04N 23/90*　　　(2023.01)

(52) U.S. Cl.
　　　CPC ... *H04N 23/90* (2023.01); *G06T 2207/10024* (2013.01); *G06T 2207/30244* (2013.01)

(58) Field of Classification Search
　　　USPC .......................................................... 382/167
　　　See application file for complete search history.

(56) References Cited

U.S. PATENT DOCUMENTS

| | | | |
|---|---|---|---|
| 2016/0093000 A1* | 3/2016 | Pevzner | G06F 16/50 |
| | | | 705/306 |
| 2018/0048826 A1* | 2/2018 | Lee | G03B 13/36 |
| 2018/0189993 A1* | 7/2018 | Cava | G06F 18/24 |
| 2019/0306477 A1* | 10/2019 | Nordback | H04N 9/3182 |
| 2022/0051419 A1* | 2/2022 | Spiteri | G06T 7/248 |

* cited by examiner

FIG. 3

| Rin | Gin | Bin | Rout | Gout | Bout |
|---|---|---|---|---|---|
| 0 | 0 | 0 | 0 | 0 | 0 |
| 0 | 0 | 1 | 0 | 2 | 3 |
| ... | ... | ... | ... | ... | ... |
| 0 | 0 | 255 | 10 | 15 | 243 |
| 0 | 1 | 0 | 0 | 3 | 1 |
| 0 | 1 | 1 | 0 | 4 | 6 |
| ... | ... | ... | ... | ... | ... |
| 0 | 1 | 255 | 8 | 23 | 254 |
| 0 | 2 | 0 | 2 | 10 | 2 |
| 0 | 2 | 1 | 2 | 12 | 5 |
| ... | ... | ... | ... | ... | ... |
| 0 | 255 | 255 | 13 | 245 | 252 |
| 1 | 0 | 0 | 2 | 1 | 1 |
| 1 | 0 | 1 | 2 | 1 | 2 |
| ... | ... | ... | ... | ... | ... |
| 255 | 255 | 255 | 243 | 252 | 246 |

IMAGE CORRECTION APPARATUS THAT PERFORMS COLOR MATCHING BETWEEN MULTIPLE IMAGE PICKUP APPARATUSES THAT TAKE IMAGE OF DISPLAY APPARATUS, IMAGE PICKUP SYSTEM, CONTROL METHOD, AND STORAGE MEDIUM

BACKGROUND OF THE INVENTION

Field of the Invention

The present invention relates to an image correction apparatus, an image pickup system, a control method, and a storage medium, and in particular to an image correction apparatus that performs color matching between a plurality of image pickup apparatuses that takes an image of a display apparatus, an image pickup system, a control method, and a storage medium.

Description of the Related Art

In video production, images are taken using a plurality of cameras, and in some cases, the color of the same subject in obtained images varies with the cameras due to individual differences between the cameras, differences in lenses to be used, and differences in imaging conditions such as a lighting environment. For this reason, there is a growing demand for brightness and color matching (hereafter referred to as "color matching") between the cameras.

In recent years, there have been increasing use cases for virtual production that uses an LED display wall, whose large screen consists of high-definition LED displays arranged in a plane direction, as the background and creates an image that looks as if it was taken at a desired location.

In such use cases, along with color matching for a real object performed in advance using a color chart, color matching is performed using a color chart displayed on an LED display wall at the shooting site. The reason why color matching is performed not only for the real object but also for the LED display wall is that color shift in the LED displays whose spectral characteristic has a peak, tends to be visually recognized due to differences in characteristics between camera's color filters.

Moreover, when an image is taken using a plurality of cameras, some of the cameras shoot the LED display wall at an angle, and hence the cameras need to be adjusted according to environments at respective installation locations.

Japanese Laid-Open Patent Publication (Kokai) No. 2002-135790 discloses a technique in which a picked-up image obtained by taking an image of a subject and a re-picked-up image obtained by taking an image of a display apparatus that displays the picked-up image are compared with each other, a correction amount is calculated based on a comparison result, and the picked-up image is corrected by applying the correction amount to data of the picked-up image.

Japanese Laid-Open Patent Publication (Kokai) No. 2012-68364 discloses a technique of adjusting the color balance of an illumination light source in a projector by making the balance of a color signal value obtained by taking a reference image projected on an actually-used screen close to a reference color signal value obtained by taking a reference image projected on a reference screen.

The prior arts (Japanese Laid-Open Patent Publication (Kokai) No. 2002-135790, Japanese Laid-Open Patent Publication (Kokai) No. 2012-68364), however, have the problem that the accuracy of color matching between the plurality of cameras is low because no consideration is given to uneven color and brightness visually recognized when the LED displays are viewed at an angle (viewing angle characteristics).

SUMMARY OF THE INVENTION

The present invention provides an image correction apparatus that is capable of improving the accuracy of color matching between a plurality of cameras, an image pickup system, a control method, and a storage medium.

Accordingly, the present invention provides an image correction apparatus that performs color matching between a plurality of image pickup apparatuses using a plurality of picked-up images generated by displaying a display image on a display screen of a display unit and causing the plurality of images pickup apparatuses to shoot the display image, the image correction apparatus comprising at least one memory that stores a set of instructions, and at least one processor that is configured to, based on the instructions, cause the image correction apparatus to: store viewing angle correction values for use in correcting viewing angle characteristics resulting from positions of the plurality of image pickup apparatuses with respect to the display screen of the display unit, to a predetermined viewing angle characteristic; subject the display images in the plurality of picked-up images to correction using the viewing angle correction values to generate a plurality of corrected images; and calculate color correction values for use in color matching between the plurality of corrected images.

Accordingly, the present invention provides an image pickup system that includes a plurality of image pickup apparatuses, a display apparatus, and an image correction apparatus communicatively connected to the image pickup apparatuses and the display apparatus, the image pickup system comprising at least one memory that stores a set of instructions, and at least one processor that is configured to, based on the instructions, cause each of the plurality of image pickup apparatuses to: pick up a display image displayed on a display surface of a display unit in accordance with a shooting instruction and generate a first picked-up image; and subject the generated first picked-up image to correction based on color/brightness correction values, wherein each of the plurality of image pickup apparatuses receives the shooting instruction, sends the first picked-up image to the image correction apparatus, receives the color/brightness correction values, and sends a second picked-up image obtained by subjecting the first picked-up image to the correction to the image correction apparatus, and cause the image correction apparatus to: store viewing angle correction values for use in correcting viewing angle characteristics resulting from positions of the plurality of image pickup apparatuses with respect to the display screen of the display unit to a predetermined viewing angle characteristic; and after displaying the display image on the display screen of the display unit, send shooting instruction to the plurality of image pickup apparatuses, receive the plurality of first picked-up images sent from the plurality of image pickup apparatuses, send the color/brightness correction values to the plurality of image pickup apparatuses, and receive the plurality of second picked-up images sent from the plurality of image pickup apparatuses, wherein the image correction apparatus upon receiving the plurality of first picked-up images, generates a plurality of corrected images by subjecting the plurality of first picked-up images to correction using the viewing angle correction values, calculates color correction values for use in color matching between the plurality of corrected images, calculates color/brightness correction values for use in color/brightness matching between the plurality of first picked-up images using the color correction values and the viewing angle correction values, and upon receiving the plurality of second picked-up images sent from the plurality of image pickup apparatuses, generates an image including the plurality of second picked-up images and sends an instruction to display the generated image to the display apparatus.

According to the present invention, the accuracy of color matching between a plurality of cameras is improved.

Further features of the present invention will become apparent from the following description of exemplary embodiments with reference to the attached drawings.

BRIEF DESCRIPTION OF THE DRAWINGS

FIG. 3 is a diagram showing how to apply color/brightness correction parameters, which are color/brightness correction values according to the first embodiment of the present invention, to picked-up images.

DESCRIPTION OF THE EMBODIMENTS

The present invention will now be described in detail below with reference to the accompanying drawings showing embodiments thereof. A description will now be given of a first embodiment of the present invention.

Figure 1:
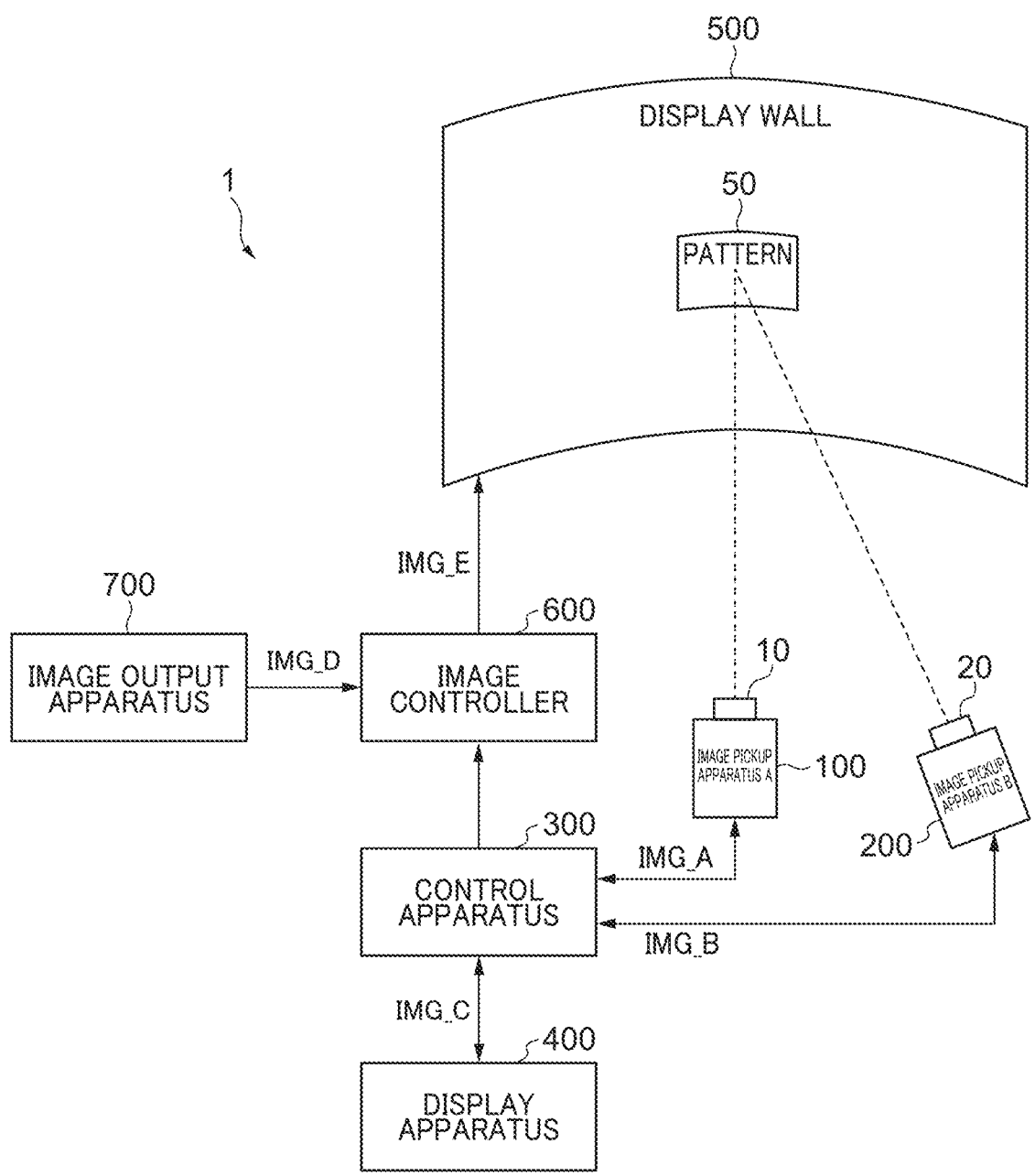
FIG. 1 is a diagram showing a configuration of an image pickup system according to a first embodiment of the present invention.
Figure 2:
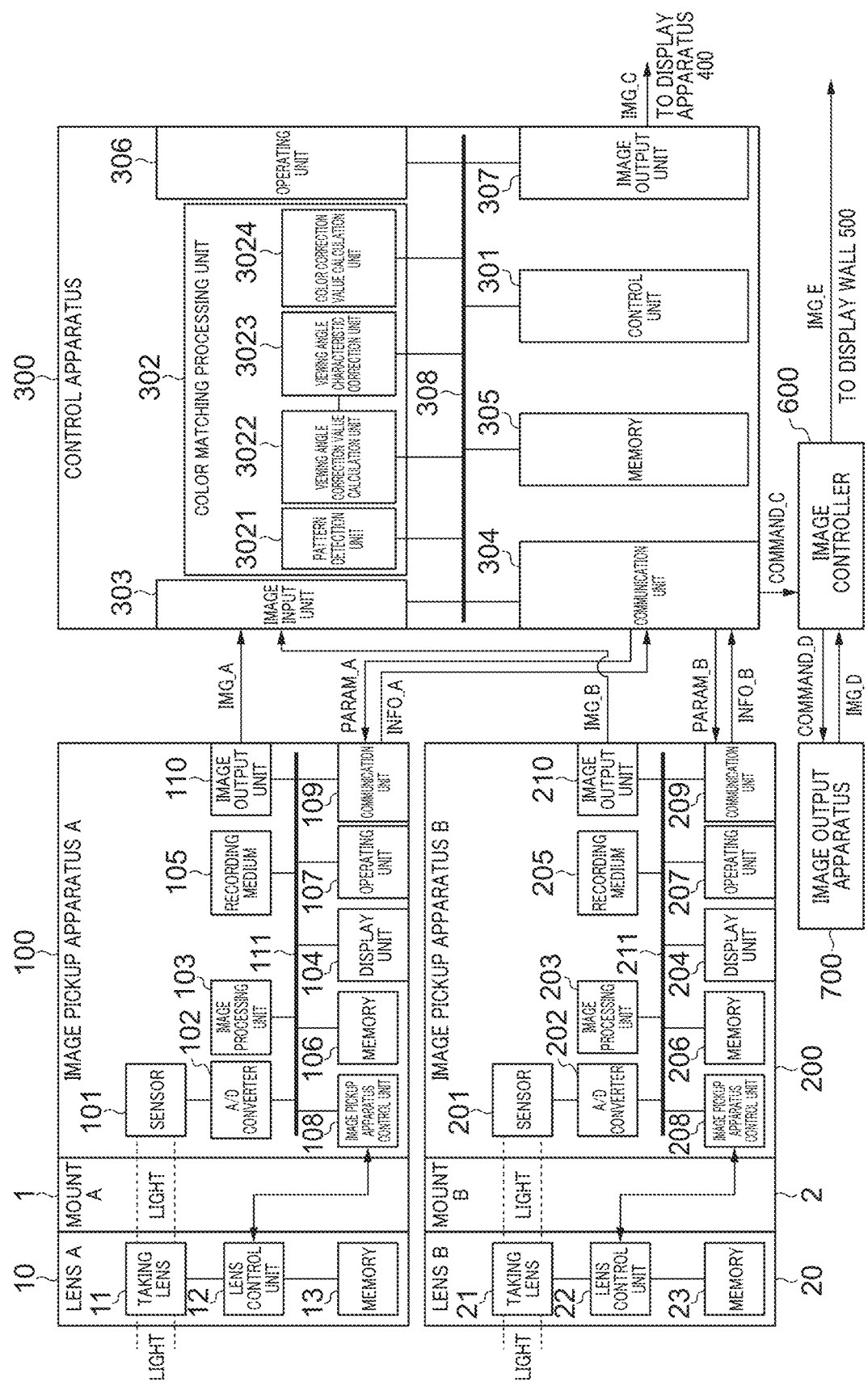
FIG. 2 is a block diagram showing a hardware configuration of the image pickup system in FIG. 1.

FIG. 1 is a diagram showing a configuration of an image pickup system 1 according to the first embodiment, and FIG. 2 is a block diagram showing a hardware configuration of the image pickup system 1 in FIG. 1.

Referring to FIG. 1, the image pickup system 1 is comprised of an image pickup apparatus A 100 on which a lens A 10 is mounted, an image pickup apparatus B 200 on which a lens B 20 is mounted, a control apparatus 300, a display apparatus 400, a display wall 500, an image controller 600, and an image output apparatus 700.

As shown in FIG. 2, the image pickup apparatus A 100 outputs a picked-up image IMG_A picked up by the image pickup apparatus A 100 to the control apparatus 300. The image pickup apparatus A 100 receives parameters PARAM_A from the control apparatus 300 and sets the parameters PARAM_A in an image processing unit 103 in the image pickup apparatus A 100 so as to perform color matching between the image pickup apparatus A 100 and the image pickup apparatus B 200. Color/brightness correction parameters (color/brightness correction values) are parameters belonging to the parameters PARAM_A as will be described in detail later. The image pickup apparatus A 100 also outputs image pickup apparatus information INFO_A to the control apparatus 300. The image pickup apparatus information INFO_A includes the model number and serial number of the image pickup apparatus A 100, the model number and serial number of the lens A 10 mounted on the image pickup apparatus A 100, and information relating on the image pickup apparatus A 100 including illumination light information and image pickup conditions.

As shown in FIG. 2, the lens A 10 is mounted on the image pickup apparatus A 100 via a mount A 1.

The mount A 1 is a mechanism for removably mounting the lens A 10 on the image pickup apparatus A 100. The mount A 1 is equipped with electric contacts for supplying power from the image pickup apparatus A 100 to the lens A 10 and enabling communication between the image pickup apparatus A 100 and the lens A 10. The mount A 1 includes a part included in the image pickup apparatus A 100 and a part included in the lens A 10, and they are illustrated collectively in FIG. 2 for the sake of convenience.

The lens A 10 is a lens mounted on the image pickup apparatus A 100 via the mount A 1. As shown in FIG. 2, light entering through the lens A 10 is received by a sensor 101 in the image pickup apparatus A 100, subjected to A/D conversion by an A/D converter 102, and subjected to image processing by the image processing unit 103, to generate the picked-up image IMG_A. The image pickup apparatus A 100 controls zooming, focusing, etc. of the lens A 10.

As shown in FIG. 2, the image pickup apparatus B 200 outputs a picked-up image IMG_B picked up by the image pickup apparatus B 200 to the control apparatus 300. The image pickup apparatus B 200 is controlled based on parameters PARAM_B received from the control apparatus 300. The image pickup apparatus B 200 sets the parameters PARAM_B in an image processing unit 203 in the image pickup apparatus B 200 so as to perform color matching between the image pickup apparatus B 200 and the image pickup apparatus A 100. Color/brightness correction parameters are parameters belonging to the parameters PARAM_B as will be described in detail later. The image pickup apparatus B 200 also outputs image pickup apparatus information INFO_B to the control apparatus 300. The image pickup apparatus information INFO_B includes the model number and serial number of the image pickup apparatus B 200, the model number and serial number of the lens B 20 mounted on the image pickup apparatus B 200, and information relating on the image pickup apparatus B 200 including illumination light information and image pickup conditions.

As shown in FIG. 2, the lens B 20 is mounted on the image pickup apparatus B 200 via a mount B 2.

The mount B 2 is a mechanism for removably mounting the lens B 20 on the image pickup apparatus B 200. The mount B 2 is equipped with electric contacts for supplying power from the image pickup apparatus B 200 to the lens B 20 and enabling communication between the image pickup apparatus B 200 and the lens B 20. The mount B 2 includes a part included in the image pickup apparatus B 200 and a part included in the lens B 20, and they are illustrated collectively in FIG. 2 for the sake of convenience.

The lens B 20 is a lens mounted on the image pickup apparatus B 200 via the mount B 2. As shown in FIG. 2, light entering through the lens B 20 is received by a sensor 201 in the image pickup apparatus B 200, subjected to A/D conversion by an A/D converter 202, and subjected to image processing by the image processing unit 203, to generate the picked-up image IMG_B. The image pickup apparatus B 200 controls zooming, focusing, etc. of the lens B 20.

As shown in FIG. 1, the control apparatus 300 (image correction apparatus) outputs an image IMG_C to the display apparatus 400. In the control apparatus 300, an image including the picked-up image IMG_A and the picked-up image IMG_B which are obtained after color matching, received from the image pickup apparatus A 100 and the image pickup apparatus B 200 respectively, a menu for control by the user of the control apparatus 300, or the like is generated as the image IMG_C. As shown in FIG. 2, the control apparatus 300 outputs the parameters PARAM_A and the parameters PARAM_B, which include the color/brightness correction parameters, to the image pickup apparatus A 100 and the image pickup apparatus B 200 respectively, based on the image pickup apparatus information INFO_A and the image pickup apparatus information INFO_B respectively received from the image pickup apparatus A 100 and the image pickup apparatus B 200. The control apparatus 300 also outputs a command COMMAND_C, which is for outputting a background image for a live-action image or a CG image for use in shooting as an image IMG_E to a display wall 500 (display unit), to the image controller 600. Note that the command COMMAND_C may include an instruction for outputting a pattern display image 50 (or, pattern 50) (display image), which is for use in color matching between the image pickup apparatus A 100 and the image pickup apparatus B 200, to the display wall 500 on the image IMG_E in a superimposed manner.

The display apparatus 400 displays the image IMG_C received from the control apparatus 300. After the color matching is performed, a user who uses the image pickup system 1 can check the picked-up image IMG_A and the picked-up image IMG_B respectively shot by the image pickup apparatus A 100 and the image pickup apparatus B 200, on the display apparatus 400.

The display wall 500 displays the image IMG_E received from the image controller 600. The display wall 500 is comprised of a plurality of units, and the resolution of each unit is, for example, 384×216. In the description of the present embodiment, it is assumed that the display wall 500 is curved as shown in FIG. 1; however, the present invention is not limited to this. The user is able to artificially produce an image as if the subject were shot at a location desired by the user by shooting the display wall 500 and a subject in front of the display wall 500 using the image pickup apparatus A 100 and the image pickup apparatus B 200. Note that in the present embodiment, the plurality of units constituting the display wall 500 is a plurality of LED display units, and the display wall 500 is constructed by the plurality of units being arranged lengthwise and breadthwise in a plane direction; however, the present invention is not limited to this. For example, the display wall 500 may be comprised of organic EL or liquid crystal panels or a rear projector, instead of LEDs. Each unit of the display wall 500 has a correction processing unit (not shown) with a color matrix or 3D-LUT (Lookup Table), and the color and the brightness are adjusted by a luminance colorimeter, or the image pickup apparatus A 100 and the image pickup apparatus B 200 so as to make the color and brightness match between the units.

As shown in FIG. 2, the image controller 600 receives the command COMMAND_C, which specifies an image to be displayed on the display wall 500, from a communication unit 304 of the control apparatus 300. In accordance with the command COMMAND_C, the image controller 600 generates a command COMMAND_D for sending an image IMG_D and sends the command COMMAND_D to the image output apparatus 700. The image controller 600 outputs, as the image IMG_E, the image IMG_D received from the image output apparatus 700 to the display wall 500. Further, in accordance with the command COMMAND_C received from the control apparatus 300, the image controller 600 can also display in a superimposed manner, a pattern display image 50 on the image IMG_E (display image) to be output to the display wall 500. Note that the image controller 600 does not send the image IMG_D, which is received from the image output apparatus 700, as it is as the image IMG_E to be output to the display wall 500. Specifically, the image controller 600 divides the image IMG_D to generate split images at the resolution of the units constituting the display wall 500, assigns the split images to the units, and outputs the split images as the image IMG_E to the respective units. The aspect ratio of the image IMG_D is the same as that of the resolution of the entire display wall 500 in some cases, and is different from that of the resolution of the entire display wall 500 in other cases. In the case where the aspect ratio of the image IMG_D is different from that of the resolution of the entire display wall 500, image controller 600 enlarges or reduces the image IMG_D to generate an image with the same aspect ratio as the resolution of the entire display wall 500, and then divides the processed image (the image IMG_D enlarged/reduced) to generate the image IMG_E.

The image output apparatus 700 stores various contents. Upon receiving an instruction to display a predetermined content from the image controller 600 as the command COMMAND_D, the image output apparatus 700 outputs the content as the image IMG_D to the image controller 600. The image output apparatus 700 is, for example, a video server or a mass storage.

Although in the description of the present embodiment, the image pickup system 1 that performs color matching between the two image pickup apparatuses, i.e., the image pickup apparatus A 100 and the image pickup apparatus B 200 is taken as an example, the number of image pickup apparatuses to be subjected to color matching has only to be plural and may be three or more. Moreover, although in the present embodiment, it is assumed that the image pickup apparatus A 100 and the image pickup apparatus B 200 are image pickup apparatuses with interchangeable lenses, they may be image pickup apparatuses with built-in lenses.

Referring to FIG. 2, a more detailed description will now be given of operations of the blocks in the image pickup apparatus A 100, the image pickup apparatus B 200, and the control apparatus 300. Note that the lens B 20 has the same configuration as that of the lens A 10, and the image pickup apparatus B 200 has the same configuration as that of the image pickup apparatus A 100; therefore, detailed description of the lens B 20 and the image pickup apparatus B 200 is omitted.

The lens A 10 has a taking lens 11, a lens control unit 12, and a memory 13.

The taking lens 11 has a drive unit (not shown), which is comprised of an actuator or a motor, and the drive unit drives the taking lens 11 under the control by the lens control unit 12. The actuator or motor of the taking lens 11 moves or operates a focus lens, a zoom lens, a diaphragm, an anti-vibration lens, etc. (none of which is shown) which the taking lens 11 has.

The lens control unit 12 has a microcomputer (not shown), and controls the taking lens 11 in accordance with a control signal received from an image pickup apparatus control unit 108 through the mount A 1.

The memory 13 is used as a storage device for various types of data used by the lens control unit 12.

The image pickup apparatus A 100 has the sensor 101 (image pickup means), the A/D converter 102, an image processing unit 103, a display unit 104, a recording medium 105, a memory 106, an operating unit 107, an image pickup apparatus control unit 108, a communication unit 109, and an image output unit 110. They are connected to a bus 111 in the image pickup apparatus A 100.

The sensor 101 is a photoelectric conversion device that has a plurality of pixels. The sensor 101 photoelectrically converts a subject image formed by the taking lens 11 in the lens A 10 by each pixel to generate and output an analog electric signal corresponding to the subject image.

The A/D converter 102 converts the analog electric signal output from the sensor 101 into a digital signal.

The image processing unit 103 performs various types of image processing on the digital signal output from the A/D converter 102 to generate the picked-up image IMG_A. The image processing unit 103 carries out what is called a development process such as an optical correction process for performing image processing to remove the influence of the optical characteristics of the taking lens 11 on an image, pixel interpolation, brightness signal processing, and color signal processing.

The picked-up image IMG_A generated by the image processing unit 103 is displayed on the display unit 104, recorded on the recording medium 105 such as a memory card, and output to an image output unit 303 of the control apparatus 300 via the image output unit 110. The image processing unit 103 (color/brightness correction means) also applies the color/brightness correction parameters for between the image pickup apparatus A 100 and the image pickup apparatus B 200 to the picked-up image IMG_A. The image output unit 110 (first communication means) retransmits the picked-up image IMG_A, to which the color/brightness correction parameters have been applied, to the control apparatus 300. In response to the retransmission of the picked-up image IMG_A, the control apparatus 300 sends an image including the picked-up image IMG_A, to which the color/brightness correction parameters have been applied, as the image IMG_C to the display apparatus 400.

A description will now be given of how to apply the color/brightness correction parameters to the picked-up image IMG_A and the picked-up image IMG_B. The color/brightness correction performed using a 3D-LUT as an example will be described. FIG. 3 shows an example of the 3D-LUT to explain the outline of the 3D-LUT. It is assumed here that an image that has not been subjected to color/brightness conversion is an 8-bit RGB image. The 3D-LUT is a table in which RGB output values are associated with specific RGB input values on a one-on-one basis. In FIG. 3, Rin, Gin, and Bin respectively represent gradation values of R, G, and B, before color/brightness conversion, and Rout, Gout, and Bout respectively represent gradation values of R, G, and B, after color/brightness conversion. In the 3D-LUT in FIG. 3, each of R, G, and B has 256 gradations (0-255), and the input gradation varies one step at a time, and therefore, a table comprised of R256×G256×B256=about 16.77 million combinations. For example, in a case where the RGB value of a pixel in a pre-color/brightness correction image is (Rin, Gin, Bin)=(0, 255, 255), (Rout, Gout, Bout)=(13, 245, 252) is obtained according to the 3D-LUT in FIG. 3. By applying the 3D-LUT to the RGB value of each of the pixels constituting a pre-color/brightness correction image using the above-described method, the image processing unit 103 obtains an image whose color/brightness has been converted.

Although in the 3D-LUT in FIG. 3, each of R, G, and B has 256 gradations, and the input gradation varies one step at a time, a 3D-LUT in which the input gradation varies, for example, 16 steps at a time may be used so as to reduce the LUT size. Namely, a 3D-LUT comprised of about R16×G16×B16=4096 combinations may be used. In this case, by using triangular pyramid interpolation or the like, which is an existing technique, the input gradations other than the combinations of RGB values defined by the 3D-LUT may be converted. Moreover, although in the present embodiment, the 3D-LUT is taken as an example of the color/brightness correction method, the present invention is not limited to this, and a 1D-LUT or a color matrix, which is an existing technique may be used as the color/brightness correction method, and some methods may be used in combination.

Referring again to FIG. 2, the memory 106 is used as a processing buffer for the image processing unit 103 and a storage device for programs to be executed by the image pickup apparatus control unit 108. The memory 106 is also used as a storage device for optical correction data in which optical correction values to be used by the image processing unit 103 are defined, and a storage device for GUI data such as a menu screen to be displayed on the display unit 104 by the image pickup apparatus A 100.

The operating unit 107 is an input device group for the user to input instructions to the image pickup apparatus A 100, which includes a power switch for turning on/off the power to the image pickup apparatus A 100, an image pickup switch for starting to record an image, a selecting/setting switch for setting various menus, and so forth.

The image pickup apparatus control unit 108, which has a microcomputer, executes programs stored in the memory 106 to control the overall operation of the image pickup apparatus A 100 including, for example, control of the image processing unit 103 and control of communication with the lens A 10.

The communication unit 109 has a function of communicating with other devices such as a LAN and a USB and communicates with the communication unit 304 of the control apparatus 300. The communication unit 109 (first communication means) sends the image pickup apparatus information INFO_A to the control apparatus 300 and receives the parameters PARAM_A from the control apparatus 300.

The image output unit 110 has a function of sending the picked-up image IMG_A to other devices such as a LAN and an HDMI (registered trademark) and outputs the picked-up image IMG_A to the image input unit 303 of the control apparatus 300.

The bus 111 connects to the A/D converter 102, the image processing unit 103, the display unit 104, the recording medium 105, the memory 106, the operating unit 107, the image pickup apparatus control unit 108, the communication unit 109, and the image output unit 110 and exchanges signals between the processing blocks.

The control apparatus 300 has a control unit 301, a color matching processing unit 302, the image input unit 303, the communication unit 304, a memory 305, an operating unit 306, and an image output unit 307, which are connected to a bus 308.

The control unit 301, which has a microcomputer, executes programs stored in the memory 305 to control the overall operation of the control apparatus (image correction apparatus) 300 including, for example, control of the color matching processing unit 302 and control of communication with each of the image pickup apparatus A 100 and the image pickup apparatus B 200.

The color matching processing unit 302 has a pattern detection unit 3021, a viewing angle correction value calculation unit 3022, a viewing angle characteristic correction unit 3023, and a color correction value calculation unit 3024.

The pattern detection unit 3021 (pattern detection means) detects the pattern display image 50 displayed on the display wall 500 from the picked-up image IMG_A and the picked-up image IMG_B obtained as a result of image pickup by the image pickup apparatus A 100 and the image pickup apparatus B 200. Specifically, the pattern detection unit 3021 is capable of detecting the pattern display image 50 using a known technique of, for example, detecting the edge or apex of the pattern display image 50, or detecting a marker superimposed on the pattern display image 50, from the picked-up image IMG_A and the picked-up image IMG_B. In the present embodiment, a color chart image (second pattern image) including a plurality of patch images, which will be described later, for use in generating a color/brightness correction parameter LUT, which will be described later, is displayed as the pattern display image 50 on the display wall 500. A white patch image (first pattern image), which is a uniform image of a specific color and used in correcting viewing angle characteristics as will be described later, is displayed in the same area displaying the pattern display image 50 on the display wall 500. Note that the white patch image and the color chart image according to the present embodiment can be modified within the scope of the present invention irrespective of their pattern shapes and colors as long as they are patterns which can generate the color/brightness correction parameter LUT and perform correction of the viewing angle characteristics.

When a detected pattern area has a trapezoid shape, the pattern detection unit 3021 transforms the detected pattern area into a rectangular shape through, for example, projective transformation. As will be described later, considering that viewing angle corrections value using the viewing angle correction value calculation unit 3022 is calculated, the pattern detection unit 3021 performs a transformation such that pattern areas obtained from the image pickup apparatus A 100 and the image pickup apparatus B 200, respectively, have the same resolution and the same aspect ratio. When the resolution of detected pattern areas is high, the pattern detection unit 3021 may carry out a process in which it further reduces the detected pattern areas according to a calculation processing load while keeping the same resolution and aspect ratio of the detected pattern areas.

Figure 4:
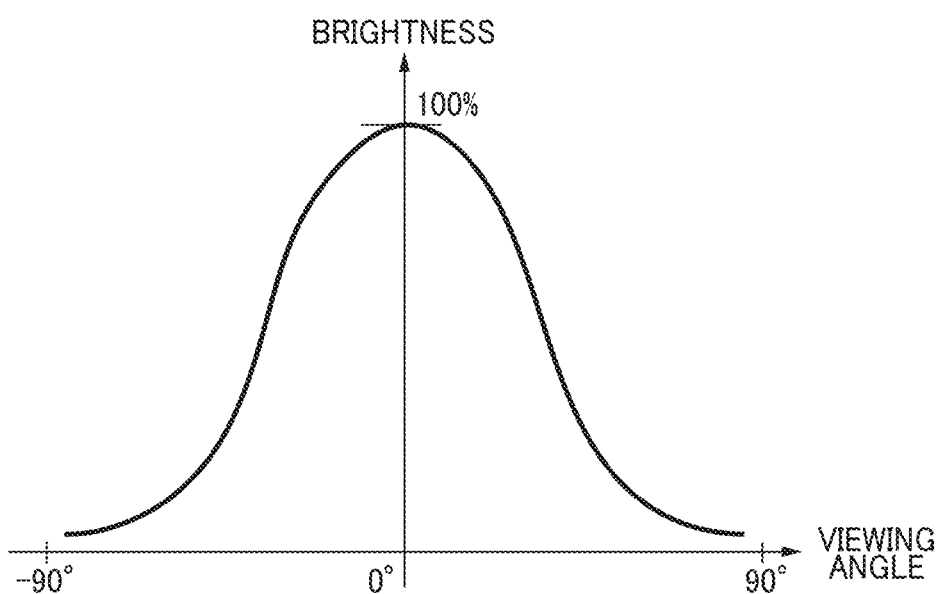
FIG. 4 is a view useful in explaining viewing angle characteristics according to the first embodiment of the present invention.
Figure 7A:
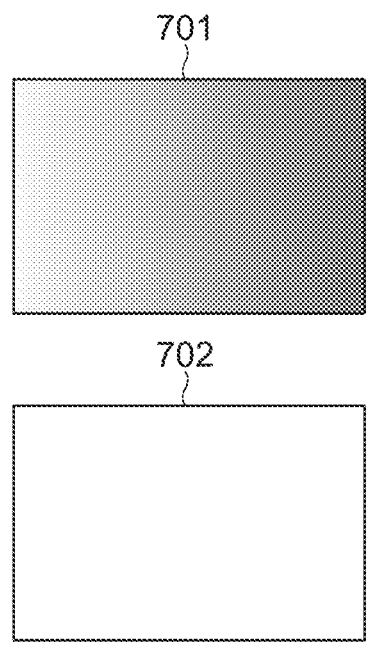
FIGS. 7A and 7B are views useful in explaining the viewing angles of respective image pickup apparatuses according to the first embodiment of the present invention and the calculation of viewing angle correction values.
Figure 7B:
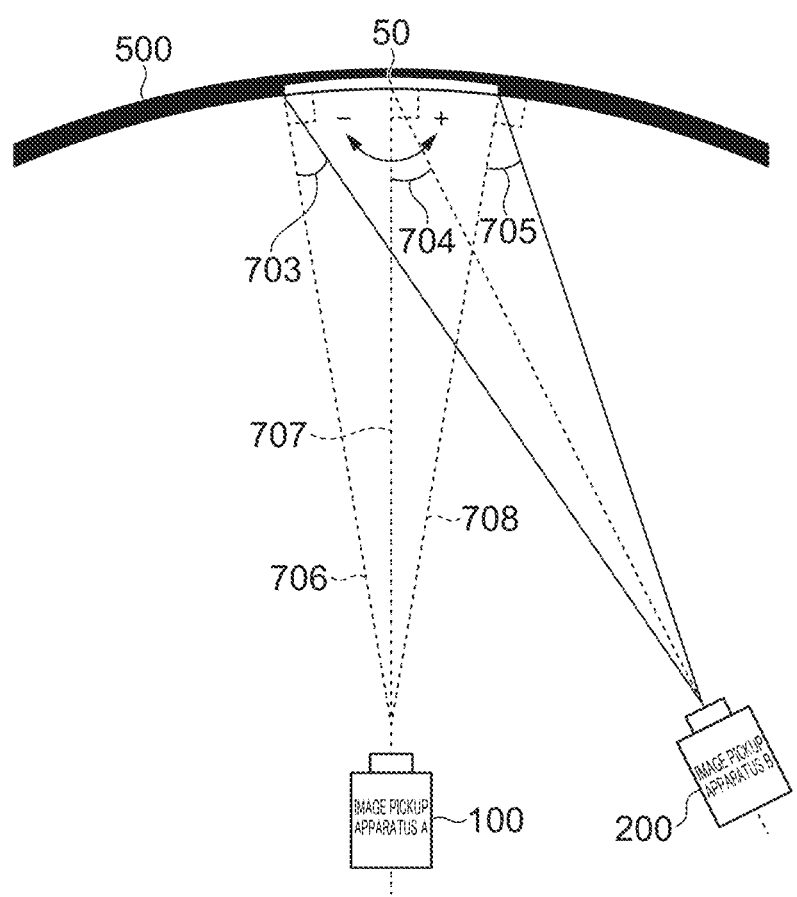

To correct the viewing angle characteristics of the image pickup apparatus A 100 and the image pickup apparatus B 200, the viewing angle correction value calculation unit 3022 (viewing angle correction value calculation means) calculates such a correction value (viewing angle correction value) that each pixel of the white patch image detected by the pattern detection unit 3021 has a predetermined brightness. The viewing angle characteristic is characteristic resulting from the position (viewing angle) of the image pickup apparatus A 100 (the image pickup apparatus B 200) with respect to the display screen of the display wall 500. More specifically, in the present embodiment, the viewing angle represent displacement from the direction of the normal from the image pickup apparatus A 100 (the image pickup apparatus B 200) to the display screen of the display wall 500 (hereafter referred to merely as "the direction of the normal to the display wall 500"). In the present embodiment, the viewing angle characteristic is characteristic of brightness and color when the white patch image on the display screen of the display wall 500 is viewed at this viewing angle, and the brightness characteristic is presented as shown in FIG. 4. In the graph of FIG. 4, the horizontal axis represents the viewing angle in the horizontal direction, and the vertical axis represents the brightness. In the present embodiment, for the viewing angles in the horizontal direction represented by the horizontal axis, the right-hand side and the left-hand side with respect to the direction of the normal to the display wall 500 are respectively designated as "+" and "−" (FIG. 7B).

In general, the viewing angle characteristics include the characteristic that the brightness and color become lower/darker as the viewing angle increases. Although in FIG. 4, only the brightness characteristic of the viewing angle characteristics is illustrated, the same holds for the color characteristic. A description will now be given of a method for correcting the viewing angle characteristics using only the brightness characteristic for the sake of simplification, and the same holds for the method using the color characteristic. Moreover, the viewing angle characteristics are present in the vertical direction as well, and method for the vertical direction is c the same as the method for the horizontal direction, and hence description thereof is omitted. As shown in FIG. 4, as viewed from the direction of the normal to the display wall 500 (the viewing angle is 0°), a white patch image A detected from the picked-up image IMG_A obtained by the image pickup apparatus A 100 placed at a location in the direction of the normal to the display wall 500 has the characteristic that the brightness is even because the display brightness is 100%. On the other hand, as viewed from a direction deviating from the direction of the normal to the display wall 500 (the viewing angle is a predetermined angle (≠0°)), the brightness of a white patch image B detected from the picked-up image IMG_B obtained by the image pickup apparatus B 200 placed at a location deviating from the direction of the normal to the display wall 500 is uneven because the display brightness is lower than 100%.

To correct the uneven brightness, the viewing angle correction value calculation unit 3022 calculates a viewing angle correction value such that the brightness is even across the white patch image B. Namely, one of the image pickup apparatus A 100 and the image pickup apparatus B 200 which has a smaller viewing angle is regarded as a reference image pickup apparatus, and in order to eliminate the viewing angle characteristic of the other image pickup apparatus (non-reference image pickup apparatus) that the brightness is uneven, the viewing angle correction value is calculated such that the brightness distribution characteristic of the white patch image B matches that of the white patch image A. In a case where a pixel value at certain coordinates in the white patch image B is (R, G, B)=(128, 128, 128) and a pixel value at the same coordinates in the white patch image A is (R, G, B)=(255, 255, 255), the viewing angle correction value is calculated such that the pixel value at the certain coordinates in the white patch image B is doubled for all of R, G, and B. The viewing angle correction value calculation unit 3022 calculates the viewing angle correction values for all the pixels in the detected white patch images.

The viewing angle characteristic correction unit 3023 (viewing angle characteristic correction means) subjects pattern areas detected by the pattern detection unit 3021 in a color matching process, which will be described later, to correction using the viewing angle correction values calculated by the viewing angle correction value calculation unit 3022.

The color correction value calculation unit 3024 (color correction value calculation means/color/brightness correction value calculation means) causes each of the image pickup apparatus A 100 and the image pickup apparatus B 200 to shoot a pattern image for calculating color correction values and carries out the color matching process using predetermined pixel values in areas detected by the pattern detection unit 3021. Specifically, in the present embodiment, the color/brightness correction parameter LUT is generated in the color matching process.

Figure 5:
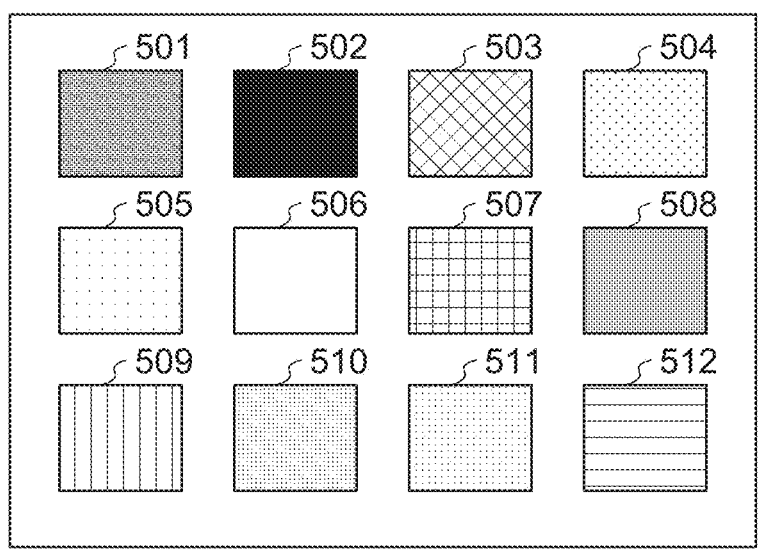
FIG. 5 is a view useful in explaining a color chart image for use in a color matching process according to the first embodiment of the present invention.

In general, the color/brightness correction parameter LUT is generated using a color chart image shown in FIG. 5. Patch images 501 to 512 of different colors are arranged in the color chart image in FIG. 5. Based on the color chart detected from the picked-up image IMG_A and the picked-up image IMG_B obtained by the image pickup apparatus A 100 and the image pickup apparatus B 200, the color correction value calculation unit 3024 generates the color/brightness correction parameter LUT for color matching between the picked-up image IMG_A and the picked-up image IMG_B. Here, the color correction value calculation unit 3024 sets one of the image pickup apparatus A 100 and the image pickup apparatus B 200 which has a smaller viewing angle as a reference image pickup apparatus, and sets the color/brightness correction parameter LUT for a non-reference image pickup apparatus. In the present embodiment, the reference image pickup apparatus is the image pickup apparatus A 100, and the non-reference image pickup apparatus is the image pickup apparatus B 200, and therefore, the color correction value calculation unit 3024 sets the color/brightness correction parameter LUT for the image pickup apparatus B 200.

Specifically, first, the patch images 501 to 512 included in the color chart image detected from the picked-up image IMG_A obtained by the image pickup apparatus A 100 (the reference image pickup apparatus) are obtained as reference patch images. Next, the patch images 501 to 512 included in the color chart image detected from the picked-up image IMG_B obtained by the image pickup apparatus B 200 (the non-reference image pickup apparatus) are obtained. Then, the patch images 501 to 512 obtained from the picked-up image IMG_B are subjected to correction using the viewing angle correction values described above. After that, a color correction parameter LUT (color correction values) is generated such that the colors of the corrected path images are close to the colors of the respective reference patch images. Further, the color/brightness correction parameter LUT for color matching between the image pickup apparatus A 100 and the image pickup apparatus B 200 is generated using the color correction parameter LUT and the viewing angle correction values.

Although in the present embodiment, the two image pickup apparatuses, i.e., the image pickup apparatus A 100 and the image pickup apparatus B 200 are used in the image pickup system 1, the number of image pickup apparatuses used in the image pickup system 1 may be three or more. For example, in a case where the number of image pickup apparatuses used in the image pickup system 1 is N, the number of non-reference image pickup apparatuses is (N−1), and hence (N−1) color/brightness correction parameter LUTs are generated.

Note that the form of the color chart and the number of patches are not limited to the examples described above. For example, the number of patches may be increased, by which more precise color information on the image pickup apparatus A 100 and the image pickup apparatus B 200 is obtained. However, when the number of patches is increased, the load on the correction parameter LUT generating process will increase accordingly, and hence there is a trade-off. Color/brightness correction parameters LUT that can be generated by the method described above may be generated whenever image pickup conditions are changed. Here, examples of the cases where image pickup conditions are changed include a case where a lens mounted on a non-reference image pickup apparatus has been replaced, a case where the color temperature of a lighting environment has changed, a case where non-reference image pickup apparatuses have been changed, and a case where parameters such as the iris of a reference image pickup apparatus has been changed. The color/brightness correction parameters LUTs generated under the respective image pickup conditions are stored in the memory 305.

The image input unit 303 (second communication means) has an image input interface such as a LAN or an HDMI (registered trademark) and obtains the picked-up image IMG_A sent or resent from the image output unit 110 of the image pickup apparatus A 100. Likewise, the image input unit 303 obtains the picked-up image IMG_B sent or resent from the image output unit 210 of the image pickup apparatus B 200.

The communication unit 304 has a function of communicating with other devices such as a LAN and a USB and communicates with the communication unit 109 of the image pickup apparatus A 100, the communication unit 209 of the image pickup apparatus B 200, and a communication unit (not shown) of the image controller 600. For example, when a reference image pickup apparatus for color/brightness correction is the image pickup apparatus A 100, the communication unit 304 sends a color/brightness correction parameter LUT determined by the color correction value calculation unit 3024 as PARAM_B to the image pickup apparatus B 200 (non-reference image pickup apparatus). Descriptions of other signals which the communication unit 304 sends and receives to and from the image pickup apparatus A 100 and the image pickup apparatus B 200, which are described above in the description of the communication unit 109 of the image pickup apparatus A 100, is omitted. The communication unit 304 sends the command COMMAND_C, which specifies a background image to be displayed on the display wall 500 or issues an instruction to display the pattern display image 50 for use in a viewing angle correction value calculation process and the color matching process, which will be described later, in a superimposed manner on the display image, to the image controller 600. In the present embodiment, the control apparatus 300, the image pickup apparatus A 100, the image pickup apparatus B 200, and the image controller 600 are connected to one another so as to communicate with one another. The connection here may be either wired connection using USB, LAN, or the like or wireless connection using Wi-Fi (registered trademark) as long as information can be exchanged through communication among the devices.

The memory 305 (storage means) is used as various processing buffers, a storage device for programs to be executed by the control unit 301, and a storage device for color/brightness correction parameters as shown in FIG. 4. The memory 305 is also used as a storage device for GUI data such as a menu screen to be displayed on the display apparatus 400 by the control apparatus 300 via the image output unit 307. Information received from the image pickup apparatus A 100 and the image pickup apparatus B 200 is stored in the memory 305.

The operating unit 306 is a group of input devices for the user to input instructions to the control apparatus 300, such as a power switch for turning on/off the power to the control apparatus 300, and a switch for starting the application of color/brightness correction parameters to a non-reference image pickup apparatus and the update of the color/brightness correction parameters.

The image output unit 307 has a function of sending images to other devices via an SDI, an HDMI (registered trademark), or the like and outputs the image IMG_C to the display apparatus 400.

Referring to FIGS. 6 to 10, a description will now be given of how to improve the accuracy of color matching between a reference image pickup apparatus and a non-reference image pickup apparatus by removing the viewing angle characteristics of the display wall 500 from color chart images detected from the picked-up images obtained by the reference image pickup apparatus and the non-reference image pickup apparatus.

<Basic Operations>

Figure 6:
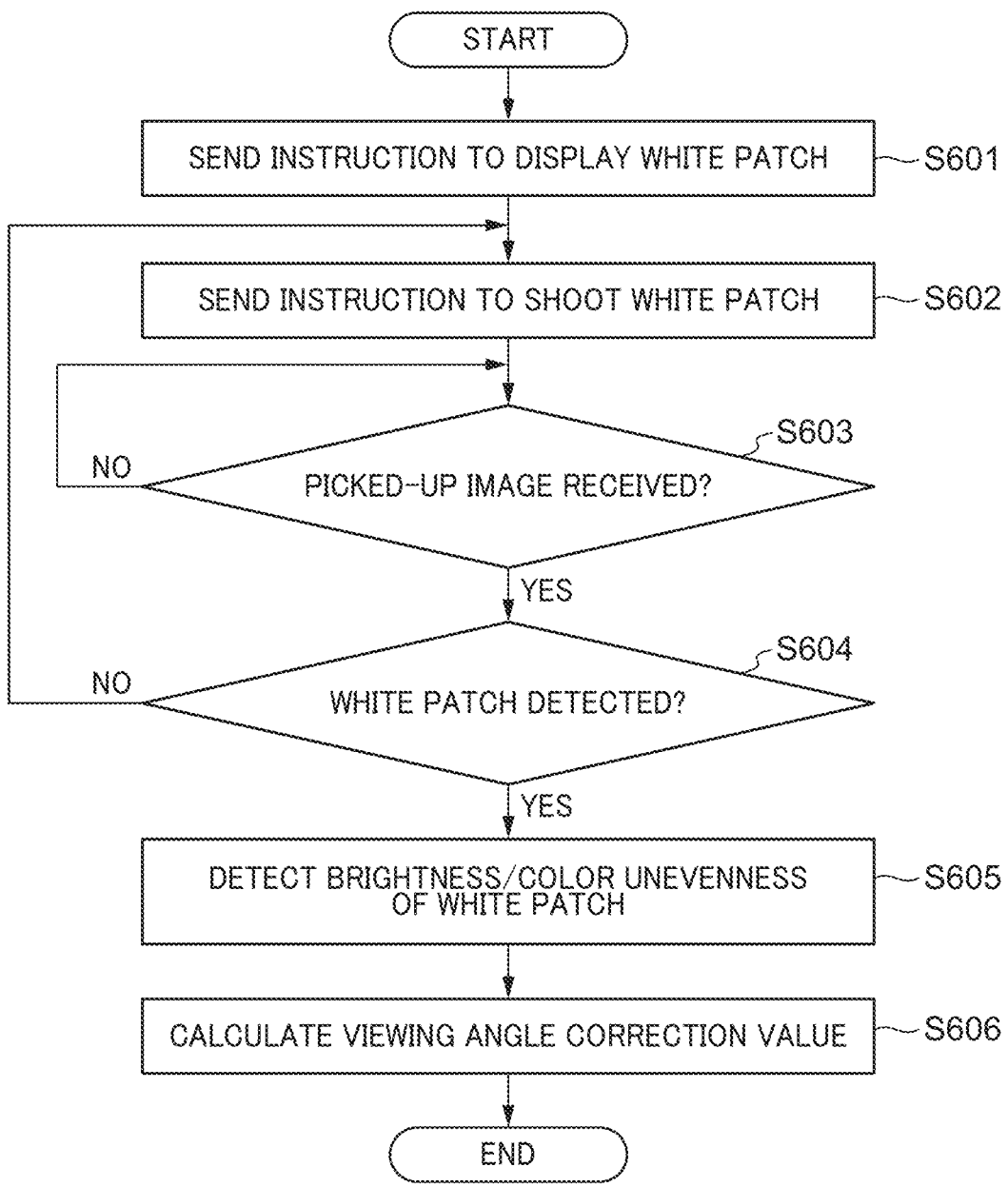
FIG. 6 is a flowchart of a viewing angle correction value calculation process according to the first embodiment of the present invention.

FIG. 6 is a flowchart of the viewing angle correction value calculation process. The present process is started when the user selects execution of color matching on a GUI (not shown) displayed on the display apparatus 400 by operating the operating unit 306 of the control apparatus 300. The present process is implemented by the control unit 301 of the control apparatus 300 reading out a program stored in the memory 305 and deploying it into a RAM (not shown).

In step S601, the control apparatus 300 outputs an instruction to display the image IMG_E, on which a white patch image is superimposed, on the display wall 500, as the command COMMAND-C to the image controller 600 via the communication unit 304. The image controller 600 that has received the command COMMAND-C generates the image IMG_E, in which the white patch image is superimposed on the area of the pattern display image 50 in the image IMG_D received from the image output apparatus 700. The image controller 600 then sends the image IMG_E and an instruction to display the image IMG_E to the display wall 500. Note that the resolution of the pattern display image 50 superimposed on the image IMG_D is preferably equal to the resolution of one of the multiple LED display units constituting the display wall 500. The reason is that the LED display units constituting the display wall 500 have different characteristics, and hence if the pattern display image 50 has a higher resolution than the resolution of one of the LED display units, there may be brightness and color differences at the boundaries of the LED display units, causing degradation in the accuracy of the color matching process, which will be described later. However, this does not apply to a case where, if the resolution of the pattern display image 50 superimposed on the image IMG_D is set as described above, the color matching process will become impossible due to the installation locations of the image pickup apparatus A 100 and the image pickup apparatus B 200.

In step S602, the control apparatus 300 sends a shooting instruction command, which is an instruction to shoot the pattern display image 50 (white patch image) displayed on the display wall 500, to each of the image pickup apparatus A 100 and the image pickup apparatus B 200 via the communication unit 304.

In step S603, the control apparatus 300 stands by until it receives the picked-up image IMG_A and the picked-up image IMG_B from the image pickup apparatus A 100 and the image pickup apparatus B 200, respectively, and when the control apparatus 300 has received the picked-up image IMG_A and the picked-up image IMG_B, the process proceeds to step S604. In a case where the control apparatus 300 has not received the picked-up image IMG_A and the picked-up image IMG_B even though a predetermined period of time has elapsed, the control apparatus 300 times out and may output an error message superimposed on the image IMG_C to the display apparatus 400 via the image output unit 307.

In the step S604, the control apparatus 300 causes the pattern detection unit 3021 (first image detection means) to detect an area where the white patch image is displayed from each of the picked-up image IMG_A and the picked-up image IMG_B respectively received from the image pickup apparatus A 100 and the image pickup apparatus B 200 in the step S603. In a case where the white patch image can be detected from both the picked-up image IMG_A and the picked-up image IMG_B (YES in the step S604), the process proceeds to step S605. On the other hand, in a case where the white patch image cannot be detected from at least one of the picked-up image IMG_A and the picked-up image IMG_B (NO in the step S604), the process returns to the step S602, in which the control apparatus 300 resends the shooting instruction command to the image pickup apparatus A 100 or the image pickup apparatus B 200, or both of them, which sent the image from which the white patch image cannot be detected. At this time, the control apparatus 300 may output an error message, which is to be displayed on the image IMG_C in a superimposed manner, to indicate that the white patch image cannot be detected, to the display apparatus 400.

In step S605, the control apparatus 300 causes the viewing angle correction value calculation unit 3022 to obtain brightness distribution information on the area of the white patch image in the pattern display image 50 detected in the step S604 and detect uneven brightness in the white patch image in the pattern display image 50. For example, the area of the white patch image in the pattern display image 50 detected from the picked-up image IMG_B received from the image pickup apparatus B 200 has a brightness distribution indicated in a patch detected image 701 in FIG. 7A. On the other hand, the area of the white patch image in the pattern display image 50 detected from the picked-up image IMG_A received from the image pickup apparatus A 100 has a brightness distribution indicated in a patch detected image 702 in FIG. 7A. The viewing angle characteristics in a case where the image pickup apparatus B 200 is shooting the pattern display image 50 from the right side of the direction of the normal to the display surface of the display wall 500 as shown in FIG. 7B correspond to the viewing angle characteristics on the (+) side in FIG. 4. As for the image pickup apparatus B 200, a viewing angle 703 with respect to the left end of the pattern display image 50 is an angle with respect to a normal 706 to the display position of the left end of the pattern display image 50, a viewing angle 704 with respect to the center of the pattern display image 50 is an angle with respect to a normal 707 to the display position of the center of the pattern display image 50, and a viewing angle 705 with respect to the right end of the pattern display image 50 is an angle with respect to a normal 708 to the display position of the right end of the pattern display image 50.

In FIG. 7B, the sizes of the viewing angles are as follows: the viewing angle 703<the viewing angle 704<the viewing angle 705. Thus, in the image (patch detected image 701) in the area of the white patch image detected from the picked-up image IMG_B received from the image pickup apparatus B 200, it becomes darker as it goes toward the right in the figure. The brightness distribution is obtained in, for example, the form of pixel values (R, G, B). The image (patch detected image 702) in the area of the white patch image detected from the picked-up image IMG_A received from the image pickup apparatus A 100 has a uniform brightness distribution. In the case where the image pickup apparatus A 100 is shooting from the direction of the normal to the display wall 500 as shown in FIG. 7B, the viewing angle characteristics of the image pickup apparatus A 100 correspond to the viewing angle characteristics (brightness characteristics) at the viewing angle of 0° in FIG. 4, and hence the patch detected image 702 detected from the picked-up image IMG_A received from the image pickup apparatus A 100 has even brightness.

When an image pickup apparatus is shooting the display wall 500 at an angle like the image pickup apparatus B 200, the brightness distribution will be different depending on the shape of the display wall 500. For example, in a case where the display wall 500 is flat, the relationship among the viewing angles 703 to 705 changes, and accordingly, the brightness distribution of the patch detected image 701 will be different from the brightness distribution shown in FIG. 7A.

In step S606, the control apparatus 300 causes the viewing angle correction value calculation unit 3022 to calculate viewing angle correction values for the patch detected image 701 based on brightness distribution information on the patch detected image 701 and brightness distribution information on the patch detected image 702 obtained in the step S605. The viewing angle correction values are calculated for all the pixels of a patch detected image. Namely, the viewing angle correction value calculation unit 3022 calculates the viewing angle correction values such that the brightness distribution in all the pixels of the patch detected image 701 corresponds to the brightness distribution in the patch detected image 702, which is the uniform brightness distribution. The calculated viewing angle correction values are stored in the memory 305 (storage means).

This completes the process in FIG. 6.

Although in the present embodiment, the viewing angle correction values are calculated such that the brightness distribution in the patch detected image 701 equivalent to the brightness distribution in the patch detected image 702, other calculation methods may be used as long as they fall within the scope of the present invention.

For example, the image pickup apparatus A 100 may not be placed in the direction of the normal (FIG. 7B) to the display wall 500. In this case, the patch detected image 702 obtained from the image pickup apparatus A 100 does not have a uniform brightness distribution but has uneven brightness like the patch detected image 701. Namely, it is only necessary to correct uneven brightness resulting from the viewing angle characteristics, and hence the locations of respective image pickup apparatuses in the image pickup system 1 are not particularly limited. For example, the respective viewing angle correction values for the patch detected image 701 and the patch detected image 702 respectively detected from the picked-up image IMG_A and the picked-up image IMG_B respectively received from the image pickup apparatus A 100 and the image pickup apparatus B 200 may be calculated using a reference image that is "even in a specific color". To be "even in a specific color" means here that graduation values in the reference image are uniform. Namely, the reference image can be considered to be equivalent to a patch detected image shot from the direction of the normal to the display wall 500 (the position where the viewing angle is 0°).

Figure 8:
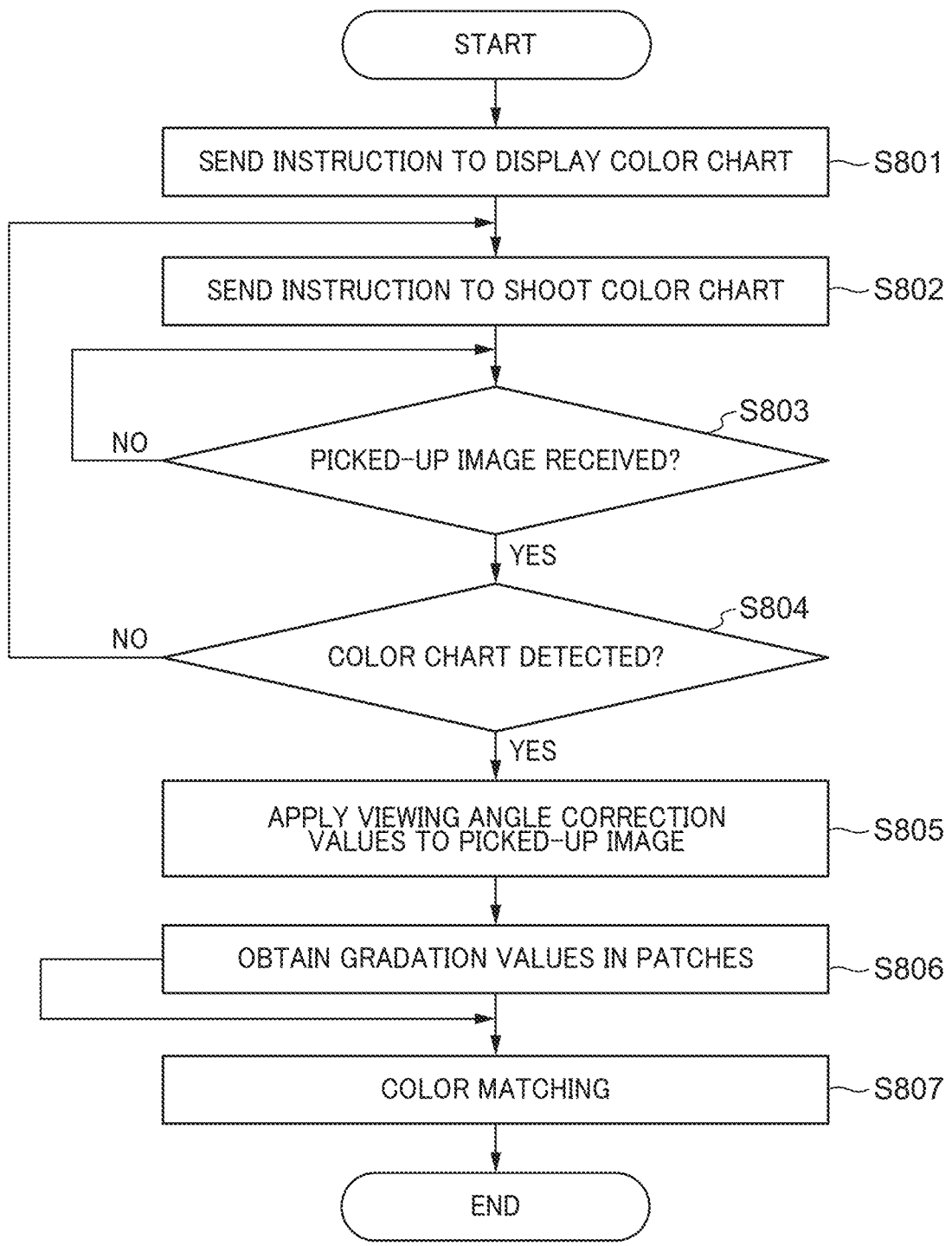
FIG. 8 is a flowchart of the color matching process according to the first embodiment of the present invention.

FIG. 8 is a flowchart of the color matching process. The present process is carried out subsequently after the viewing angle correction value calculation process (FIG. 6) is ended. The present process is implemented by the control unit 301 of the control apparatus 300 reading out a program stored in the memory 305 and deploying it into the RAM (not shown).

Note that a viewing angle correction value calculation start button and a color matching start button may be separately provided on a GUI (not shown) displayed on the display apparatus 400. In this case, when the viewing angle correction value calculation start button is selected by user operation, the viewing angle correction value calculation process (FIG. 6) is started, and when the color matching start button is selected by user operation, the color matching process (FIG. 8) is started.

In step S801, the control apparatus 300 outputs an instruction to display the image IMG_E, on which a color chart image is superimposed, on the display wall 500, as the command COMMAND-C to the image controller 600 via the communication unit 304. The image controller 600 that has received the command COMMAND-C generates the image IMG_E, in which the pattern display image 50 (color chart image) is superimposing on the image IMG_D received from the image output apparatus 700. The image controller 600 then sends the image IMG_E and an instruction to display the image IMG_E to the display wall 500. Note that the resolution of the color chart image superimposed on the image IMG_D in the step S801 is equal to the resolution of the white patch image superimposed on the image IMG_D in the step S601.

In step S802, the control apparatus 300 sends a shooting instruction command, which is an instruction to shoot the pattern display image 50 (color chart image) displayed on the display wall 500, to each of the image pickup apparatus A 100 and the image pickup apparatus B 200 via the communication unit 304 (second communication means).

In step S803, the control apparatus 300 stands by until it receives the picked-up image IMG_A and the picked-up image IMG_B from the image pickup apparatus A 100 and the image pickup apparatus B 200, respectively, and when the control apparatus 300 has received the picked-up image IMG_A and the picked-up image IMG_B, the process proceeds to step S804. In a case where the control apparatus 300 has not received the picked-up image IMG_A and the picked-up image IMG_B even though a predetermined period of time has elapsed, the control apparatus 300 times out and may output an error message superimposed on the image IMG_C to the display apparatus 400 via the image output unit 307.

In the step S804, the control apparatus 300 causes the pattern detection unit 3021 (second image detection means) to detect an area of the pattern display image 50 (color chart image) from each of the picked-up image IMG_A and the picked-up image IMG_B respectively received from the image pickup apparatus A 100 and the image pickup apparatus B 200, which are obtained in the step S803. In a case where the color chart image can be detected from both the picked-up image IMG_A and the picked-up image IMG_B (YES in the step S804), the process proceeds to step S805. On the other hand, in a case where the color chart image cannot be detected from at least one of the picked-up image IMG_A and the picked-up image IMG_B (NO in the step S804), the process returns to the step S802, in which the control apparatus 300 resends the shooting instruction command to the image pickup apparatus A 100 or the image pickup apparatus B 200, or both of them, which sent the image from which the color chart image cannot be detected. At this time, the control apparatus 300 may output an error message, which is to be displayed on the image IMG_C in a superimposed manner, to indicate that the color chart image cannot be detected, to the display apparatus 400.

Figure 9:
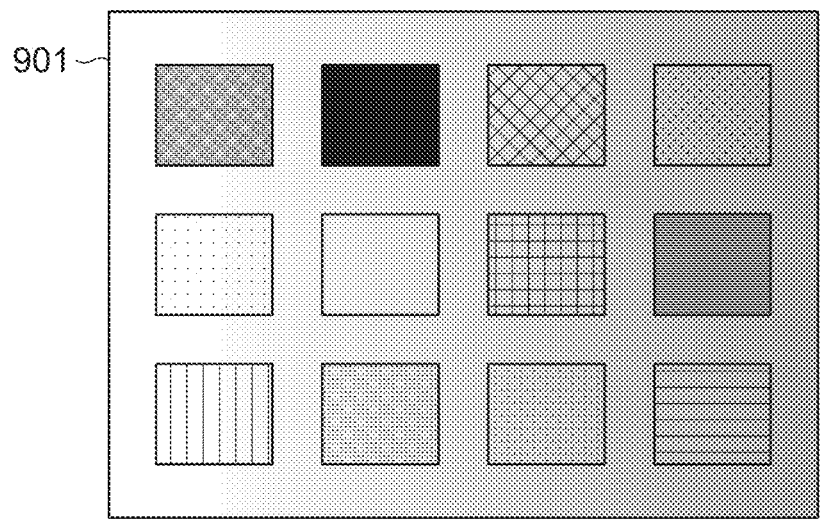
FIG. 9 is a view showing examples of color chart images detected from images taken by the respective image pickup apparatuses according to the first embodiment of the present invention.
Figure 9:
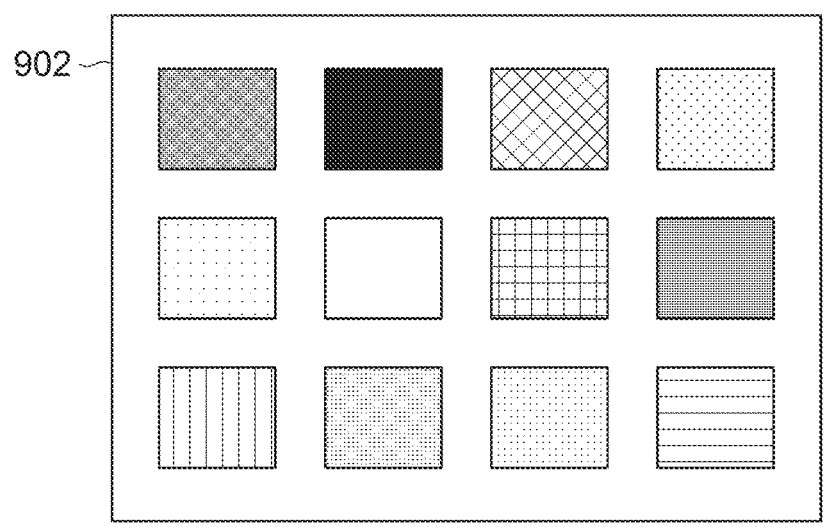
Figure 9:
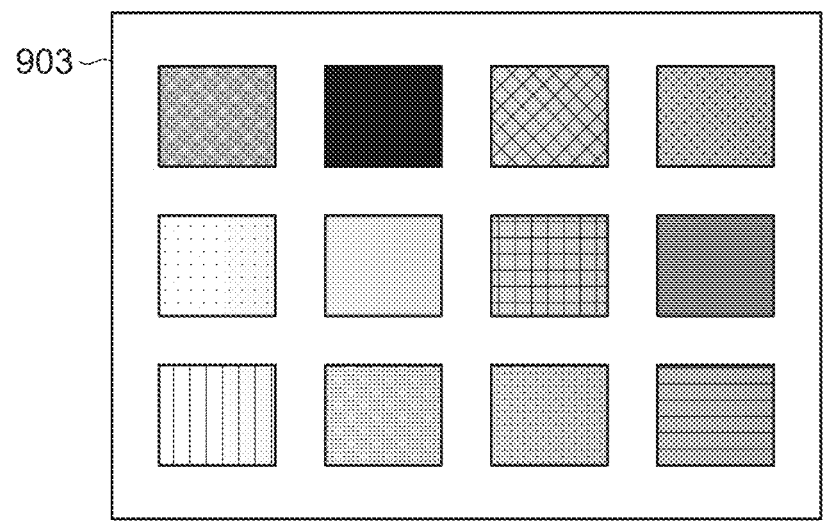

FIG. 9 is a view showing examples of the color chart image detected in the step S804.

A color chart image 901 is a color chart image detected from the picked-up image IMG_B received from the image pickup apparatus B 200, and has brightness distribution which becomes darker as it goes toward the right in the figure. The reason is that the image pickup apparatus B 200 is located on the right side in the figure of the direction of the normal to the display wall 500 (the location where the viewing angle is greater than 0°) (FIG. 1), and hence the brightness of the display wall 500 viewed from the image pickup apparatus B 200 decreases due to the viewing angle characteristics (FIG. 4) as it goes toward the right in the display wall 500. The brightness distribution is obtained in, for example, the form of pixel values (R, G, B).

A color chart image 902 is a color chart image detected from the picked-up image IMG_A received from the image pickup apparatus A 100, and has a uniform brightness distribution. The reason is that as shown in FIG. 1, the image pickup apparatus A 100 is located in the direction of the normal to the display wall 500 (the location where the viewing angle is 0°), and hence the display brightness is 100% due to the viewing angle characteristics (FIG. 4), and the brightness of the display wall 500 viewed from the image pickup apparatus A 100 looks even.

In step S805, the viewing angle characteristic correction unit 3023 applies the viewing angle correction values calculated and stored in the memory 305 in the step S606 to the color chart image 901 detected in the step S804 to generate a color chart image 903 (corrected image). In the present embodiment, the viewing angle correction values are calculated in the step S606 such that the patch detected image 701 is corrected to be close to the patch detected image 702 (FIG. 7). Thus, when the viewing angle correction value is applied to the color chart image 901, the color chart image 903 (FIG. 9) is generated. As a result of this correction, the viewing angle characteristics of the picked-up image resulting from the locations of image pickup apparatus with respect to the direction of the normal to the display wall 500 are removed. However, in the color chart image 903, color shift of the color patches resulting from individual difference of a lens or the like in the image pickup apparatus B 200 still remains. Note that since there are no viewing angle characteristics to be removed from the color chart image 902, the viewing angle characteristic correction unit 3023 generates the color chart image 902 itself as a corrected image. However, in a case where there are viewing angle characteristics to be removed from the color chart image 902, and the viewing angle correction values for them were calculated in the step S606, a corrected image is generated in the same way as the color chart image 901 is generated.

In step S806, the color correction value calculation unit 3024 obtains gradation values in the respective color patches in each of the color chart image 902 detected in the step S804 and the color chart image 903 generated in the step S805. Coordinate values of the respective color patches are determined in advance, and hence gradation values at specific coordinate values should be read. At this time, if only one pixel is taken out from each color patch, gradation values may vary due to image pickup noise, and hence a plurality of pixels are taken out from one color patch to obtain an average value and use it. In the present embodiment, there are 12 color patches as indicated in the color chart image in FIG. 5, gradation values in the 12 color patches are obtained from each of the color chart images 902 and 903 in the step S806.

In the step S807, the control apparatus 300 uses the gradation values in the respective color patches obtained from each of the color chart images 902 and 903 in the step S806 to generate a color correction parameter LUT (color correction values) for color matching between the color chart images 902 and 903. Then, the control apparatus 300 generates, based on the color correction parameter LUT and the viewing angle correction values stored in the memory 305 in the step S606, a color/brightness correction parameter LUT for color/brightness matching between the image pickup apparatus A 100 and the image pickup apparatus B 200 (color matching). In this manner, the color/brightness correction parameter LUT is generated.

After that, the control unit 301 generates the parameters PARAM_A and the parameters PARAM_B based on the generated color/brightness correction parameter LUT, the image pickup apparatus information INFO_A and the image pickup apparatus information INFO_B, and sends the generated parameters PARAM_A and parameters PARAM_B to the image pickup apparatus A 100 and the image pickup apparatus B 200 via the communication unit 304. In the image pickup apparatus A 100, when the communication unit 109 receives the parameters PARAM_A, first, the image processing unit 103 (color correction means) subjects the picked-up image IMG_A to correction using the parameters PARAM_A. Next, the image output unit 110 (first communication means) resends the corrected picked-up image IMG_A to the control apparatus 300. In the image pickup apparatus B 200, when the communication unit 209 receives the parameters PARAM_B, the similar processing is performed, and the corrected picked-up image IMG_B is resent to the control apparatus 300. Upon receiving the corrected picked-up image IMG_A and the corrected picked-up image IMG_B, the control unit 301 (display instruction means) generates an image including those images as the image IMG_C and sends it to the display apparatus 400, thus instructing the display apparatus 400 to display the image IMG_C.

This completes the process in FIG. 8.

In the present embodiment, color matching between a plurality of image pickup apparatuses whose viewing angles with respect to the display wall 500 are different is performed after color chart images shot by the plurality of image pickup apparatuses and displayed on the display wall 500 are corrected using the viewing angle correction values and remove the viewing angle characteristics. This improves the accuracy of color matching between the plurality of image pickup apparatuses.

Figure 10:
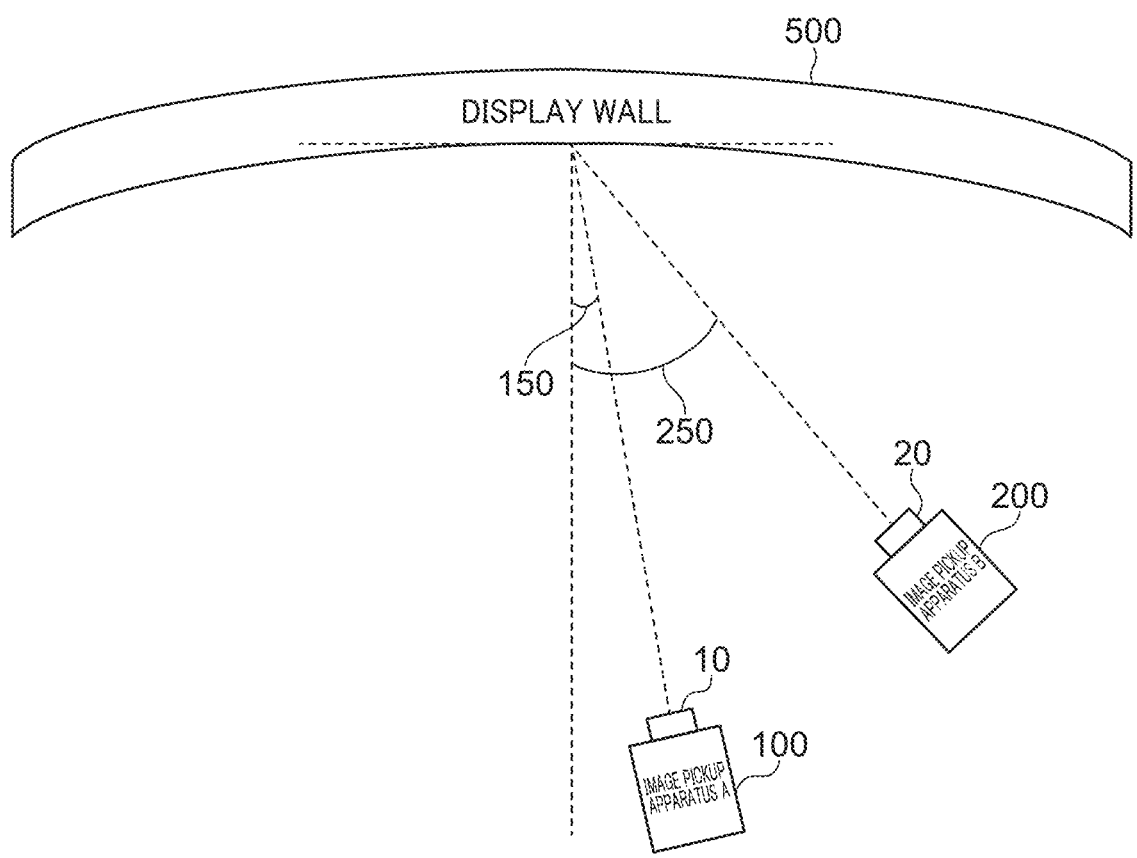
FIG. 10 is a view showing a variation of the arrangement of the respective image pickup apparatuses according to the first embodiment of the present invention.

Note that although in the present embodiment, the image pickup apparatus A 100 is placed in the direction of the normal to the display wall 500, the present invention is not limited to this. For example, as shown in FIG. 10, the image pickup apparatus A 100 may be placed at a viewing angle 150 with respect to the direction of the normal to the display wall 500, and the image pickup apparatus B 200 may be placed at a viewing angle 250 with respect to the direction of the normal to the display wall 500. In this case, the viewing angle correction values may be calculated, instead of using a reference image as described above, using the image pickup apparatus A 100 with the least deviation from (the least viewing angle with respect to) the direction of the normal to the display wall 500 as a reference image pickup apparatus for color matching. In this case, the viewing angle correction values may be calculated such that the brightness distribution of the white patch image in the picked-up image IMG_B picked up by the image pickup apparatus B 200 is close to the brightness distribution of the white patch image in the picked-up image IMG_A picked up by the image pickup apparatus A 100. Alternatively, in the layout shown in FIG. 10, the viewing angle 150 of the image pickup apparatus A 100 and the viewing angle 250 of the image pickup apparatus B 200 may be measured using a known measurement means (angle detection means), and the viewing angle correction values may be calculated based on the viewing angle characteristics (FIG. 4) stored in the memory 305 in advance.

Since the display wall 500 is comprised of the plurality of LED display units, the characteristics of the LEDs vary depending on their positions within the display wall 500. Thus, if the display position of the pattern display image 50 is changed when it is shot by the image pickup apparatus A 100 or the image pickup apparatus B 200, there may be differences in color/brightness between the cameras due to differences in viewing angle characteristics, differences in the characteristics of the cameras, and differences in the characteristics of the LEDs, which may result degradation in the accuracy of color matching. Therefore, it is preferred that the display position of the pattern display image 50 on the display wall 500 is not changed each time it is shot by each of the image pickup apparatus A 100 or the image pickup apparatus B 200. Note that although in the present embodiment described above, the pattern display image 50 is displayed at the center of the display wall 500, the pattern display image 50 may be displayed at another position as long as it is included in the angle of view of an image pickup apparatus. It is preferred that the pattern display image 50 is displayed on an LED display unit which is most frequently included in the angle of view when the user produces contents by shooting a subject in front of the display wall 500.

Moreover, although in the present embodiment described above, the viewing angle correction values are calculated using only brightness characteristics, they may be calculated using color characteristics as well as brightness characteristics. In this case, the viewing angle correction values can be calculated using a color distribution with respect to viewing angles as with the brightness distribution with respect to viewing angles in FIG. 4.

A description will now be given of a second embodiment of the present invention. The same components in the present embodiment as those in the first embodiment are designated by the same reference symbols, and descriptions that duplicates descriptions in the first embodiment are omitted.

Figure 11:
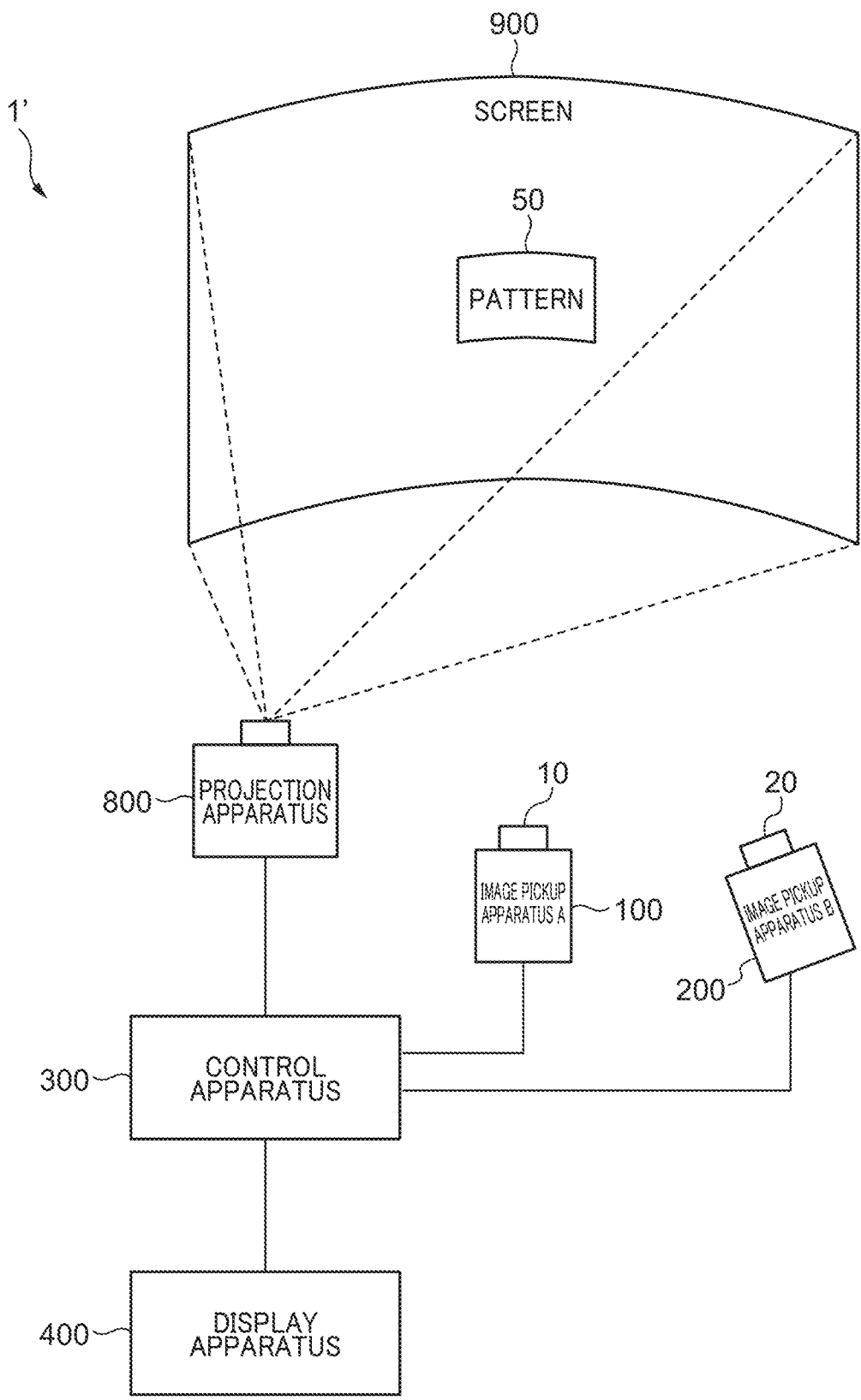
FIG. 11 is a diagram showing a configuration of an image pickup system using a projection apparatus, according to a second embodiment of the present invention.

FIG. 11 is a diagram showing a configuration of an image pickup system 1' according to the second embodiment.

The image pickup system 1' according to the second embodiment is comprised of the image pickup apparatus A 100 on which the lens A 10 is mounted, the image pickup apparatus B 200 on which the lens B 20 is mounted, the control apparatus 300, the display apparatus 400, a projection apparatus 800, and a screen 900 (display unit).

In the first embodiment, the image pickup system 1 is constructed with the display wall 500, and in the present embodiment, an image pickup system is constructed with the projection apparatus 800 and the screen 900.

The projection apparatus 800 displays (projects), on the screen 900, an image which is transformed in advance by the image output unit 307 such that the picked-up image does not extend off the screen 900 when being displayed (projected). Alternatively, the projection apparatus 800 displays (projects), on the screen 900, an image transformed by a transformation unit (not shown) in the projection apparatus 800.

The display position of the pattern display image 50 on the screen 900 is the same as the display position of the pattern display image 50 on the display wall 500 in the first embodiment, and hence description thereof is omitted.

The screen 900 also has the viewing angle characteristics like the display wall 500. The display brightness in the direction of the normal to the display wall 500 is 100%. On the other hand, light from the projection apparatus 800 is reflected on the screen 900 and enters the user's eyes, and hence the display brightness in the direction of the normal to the display screen of the screen 900 (hereafter referred to merely as "the direction of the normal to the screen 900") is not 100%. Namely, the display brightness of the screen 900 is 100% in an exit direction of light emitting at an exit angle of light from the screen 900, which is a position that is symmetric, about the direction of the normal to the screen 900, with an incident angle of light from the projection apparatus 800. Namely, the exit direction at the exit angle of the light from the screen 900 can be replaced as the direction of 0° in the graph of FIG. 4 showing the viewing angle characteristics.

The other configurations, functions, etc. are the same as those of the first embodiment, and hence description thereof is omitted.

Although the present invention has been described by way of the preferred embodiments, the present invention should not be limited to the above-described specific embodiments, but various modifications and alterations can be made without departing from the spirit and scope of the present invention. Some of the above-described embodiments may be combined where appropriate.

Moreover, the present invention encompasses a configuration in which programs of software that implements the functions of the above-described embodiments are supplied to a system or apparatus including a computer capable of executing the programs, from a recording medium directly or via wired/wireless communication, to execute the program.

Thus, program codes themselves which are supplied to and installed in a computer so that the computer can implement the functions and processes of the present invention also implement the present invention. Namely, the present invention includes computer programs themselves for implementing the functions and processes of the present invention.

In this case, the programs may be in any forms as long as they have functions of the programs such as an object code, a program to be executed by an interpreter, and script data to be supplied to an OS.

Examples of the recording medium for supplying the programs include a hard disk, a magnetic recording medium such as a magnetic tape, an optical/magneto-optical storage medium, and a nonvolatile semiconductor memory.

Examples of the method for supplying the programs include a method in which a computer program that forms the present invention is stored in a server on a computer network, and a client computer connects to the server, downloads the computer program, and executes the same.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-42125 filed on Mar. 17, 2022, which is hereby incorporated by reference wherein in its entirety.

What is claimed is:

1. An image correction apparatus that performs color matching between a plurality of image pickup apparatuses using a plurality of picked-up images generated by displaying a display image on a display screen of a display unit and causing the plurality of images pickup apparatuses to shoot the display image, the image correction apparatus comprising:
at least one memory that stores a set of instructions; and
at least one processor that is configured to, based on the instructions, cause the image correction apparatus to:
store viewing angle correction values for use in correcting viewing angle characteristics resulting from positions of the plurality of image pickup apparatuses with respect to the display screen of the display unit, to a predetermined viewing angle characteristic;
subject the display images in the plurality of picked-up images to correction using the viewing angle correction values to generate a plurality of corrected images;
calculate color correction values for use in color matching between the plurality of corrected images;
after displaying, on the display screen, a first pattern image in an area where the display image is displayed, detect the first pattern image from each of a plurality of other picked-up images generated by causing the plurality of images pickup apparatuses to shoot the displayed first pattern image;
calculate the viewing angle correction values to be stored from the plurality of first pattern images detected from the plurality of other picked-up images;
after displaying a second pattern image as the display image on the display screen, detect the second pattern image from each of the plurality of picked-up images generated by causing the plurality of images pickup apparatuses to shoot the displayed second pattern; and
subject the plurality of second pattern images detected from the plurality of picked-up images to correction using the calculated viewing angle correction values, to generate the plurality of corrected images for use in calculating the color correction values.

2. The image correction apparatus according to claim 1, wherein the first pattern image is an even image of a specific color, and the second pattern image is a color chart image in which one or more patch images of different colors are arranged.

3. The image correction apparatus according to claim 2, wherein the viewing angle correction values are used to make at least one of brightness and color in respective pixels uniform in each of the detected first pattern image.

4. The image correction apparatus according to claim 2, wherein an image pickup apparatus whose viewing angle with respect to the display surface of the display unit is the smallest among the plurality of image pickup apparatuses is used as a reference image pickup apparatus; and
the viewing angle correction values are used to make distribution characteristics comprising at least one of brightness and color in the respective detected first pattern images match the distribution characteristics of the respective first pattern image detected from picked-up images obtained by the reference image pickup apparatus.

5. The image correction apparatus according to claim 4, wherein the color correction values are used to make colors of the plurality of corrected images match a color of a corrected image generated from the picked-up image obtained by the reference image pickup apparatus.

6. The image correction apparatus according to claim 2, wherein the viewing angle correction values are used to make distribution characteristics comprising at least one of brightness and color in the respective detected first pattern images match the distribution characteristics of the first pattern image obtained by shooting in advance from a position at a viewing angle of 0 degree with respect to the display surface of the display unit.

7. The image correction apparatus according to claim 1, wherein the at least one processor further causes the image correction apparatus to:
store the viewing angle characteristics;
detect viewing angles of the respective image pickup apparatuses with respect to the display surface of the display unit; and
calculate the viewing angle correction values based on the respective stored viewing angle characteristics for the detected viewing angles.

8. The image correction apparatus according to claim 1, wherein the position of the display image on the display surface of the display unit is not changed each time the display image is shot by the plurality of image pickup apparatuses.

9. The image correction apparatus according to claim 1, wherein the display unit is a display wall comprising a plurality of LED display units.

10. The image correction apparatus according to claim 1, wherein the display unit is a screen on which the display image projected by a projection apparatus is displayed on the display surface.

11. An image pickup system that includes a plurality of image pickup apparatuses, a display apparatus, and an image correction apparatus communicatively connected to the image pickup apparatuses and the display apparatus, the image pickup system comprising:
  at least one memory that stores a set of instructions; and
  at least one processor that is configured to, based on the instructions,
  cause each of the plurality of image pickup apparatuses to:
    pick up a display image displayed on a display surface of a display unit in accordance with a shooting instruction and generate a first picked-up image; and
    subject the generated first picked-up image to correction based on color/brightness correction values,
    wherein each of the plurality of image pickup apparatuses receives the shooting instruction, sends the first picked-up image to the image correction apparatus, receives the color/brightness correction values, and sends a second picked-up image obtained by subjecting the first picked-up image to the correction to the image correction apparatus, and
  cause the image correction apparatus to:
    store viewing angle correction values for use in correcting viewing angle characteristics resulting from positions of the plurality of image pickup apparatuses with respect to the display screen of the display unit to a predetermined viewing angle characteristic; and
    after displaying the display image on the display screen of the display unit, send shooting instruction to the plurality of image pickup apparatuses, receive the plurality of first picked-up images sent from the plurality of image pickup apparatuses, send the color/brightness correction values to the plurality of image pickup apparatuses, and receive the plurality of second picked-up images sent from the plurality of image pickup apparatuses,
  wherein the image correction apparatus
  upon receiving the plurality of first picked-up images, generates a plurality of corrected images by subjecting the plurality of first picked-up images to correction using the viewing angle correction values,
  calculates color correction values for use in color matching between the plurality of corrected images,
  calculates color/brightness correction values for use in color/brightness matching between the plurality of first picked-up images using the color correction values and the viewing angle correction values, and
  upon receiving the plurality of second picked-up images sent from the plurality of image pickup apparatuses, generates an image including the plurality of second picked-up images and sends an instruction to display the generated image to the display apparatus.

12. A control method for an image correction apparatus that performs color matching between a plurality of image pickup apparatuses, using a plurality of picked-up images which are generated by the plurality of image pickup apparatuses shooting a display image on a display screen of a display unit, the control method comprising:
  storing viewing angle correction values for use in correcting viewing angle characteristics resulting from positions of the plurality of image pickup apparatuses with respect to the display screen of the display unit, to a predetermined viewing angle characteristic;
  subjecting the display images in the plurality of picked-up images to correction using the viewing angle correction values to generate a plurality of corrected images;
  calculating color correction values for use in color matching between the plurality of corrected images,
  after displaying, on the display screen, a first pattern image in an area where the display image is displayed, detecting the first pattern image from each of a plurality of other picked-up images generated by causing the plurality of images pickup apparatuses to shoot the displayed first pattern image;
  calculating the viewing angle correction values to be stored from the plurality of first pattern images detected from the plurality of other picked-up images;
  after displaying a second pattern image as the display image on the display screen, detecting the second pattern image from each of the plurality of picked-up images generated by causing the plurality of images pickup apparatuses to shoot the displayed second pattern; and
  subjecting the plurality of second pattern images detected from the plurality of picked-up images to correction using the calculated viewing angle correction values, to generate the plurality of corrected images for use in calculating the color correction values.

13. A computer-readable non-transitory storage medium storing a computer-executable program for executing a control method for an image correction apparatus that performs color matching between a plurality of image pickup apparatuses, using a plurality of picked-up images which are generated by the plurality of image pickup apparatuses shooting a display image on a display screen of a display unit, the control method comprising:
  storing viewing angle correction values for use in correcting viewing angle characteristics resulting from positions of the plurality of image pickup apparatuses with respect to the display screen of the display unit, to a predetermined viewing angle characteristic;
  subjecting the display images in the plurality of picked-up images to correction using the viewing angle correction values to generate a plurality of corrected images;
  calculating color correction values for use in color matching between the plurality of corrected images,
  after displaying, on the display screen, a first pattern image in an area where the display image is displayed, detecting the first pattern image from each of a plurality of other picked-up images generated by causing the plurality of images pickup apparatuses to shoot the displayed first pattern image;
  calculating the viewing angle correction values to be stored from the plurality of first pattern images detected from the plurality of other picked-up images;
  after displaying a second pattern image as the display image on the display screen, detecting the second pattern image from each of the plurality of picked-up images generated by causing the plurality of images pickup apparatuses to shoot the displayed second pattern; and subjecting the plurality of second pattern images detected from the plurality of picked-up images to correction using the calculated viewing angle correction values, to generate the plurality of corrected images for use in calculating the color correction values.

* * * * *